United States Patent [19]

Musil et al.

[11] Patent Number: 5,614,322
[45] Date of Patent: Mar. 25, 1997

[54] FLEXIBLE PLASTIC WINDOW SHIELD AND PROCESS FOR ITS PRODUCTION

[75] Inventors: Ingrid Musil, Aachen; Karin Broring, Monchengladbach; Udo Gelderie; Gerhard Holzer, both of Aachen, all of Germany

[73] Assignee: Saint-Gobain Vitrage International, Courbevoie, France

[21] Appl. No.: 180,815

[22] Filed: Jan. 10, 1994

Related U.S. Application Data

[63] Continuation of Ser. No. 919,264, Jul. 27, 1992, abandoned, and a continuation-in-part of Ser. No. 678,705, Apr. 1, 1991, Pat. No. 5,277,944.

[30] Foreign Application Priority Data

Jul. 26, 1991 [DE] Germany ........................... 41 24 839.2

[51] Int. Cl.$^6$ .................................................. C08G 18/10
[52] U.S. Cl. ........................... 428/423.1; 528/66; 528/81
[58] Field of Search ..................... 428/423.1; 528/66, 528/81

[56] References Cited

U.S. PATENT DOCUMENTS

| 4,010,311 | 3/1977  | Lewis et al.  | 428/423.1 |
| 4,657,796 | 4/1987  | Musil et al.  | 428/38    |
| 4,784,916 | 11/1988 | Bravet et al. | 428/423.1 |
| 4,830,806 | 5/1989  | Daude et al.  | 264/216   |
| 5,032,665 | 7/1991  | Bravet et al. | 528/53    |
| 5,277,944 | 1/1994  | Holzer et al. | 428/412   |

*Primary Examiner*—Rachel Gorr
*Attorney, Agent, or Firm*—Oblon, Spivak, McClelland, Maier & Neustadt, P.C.

[57] ABSTRACT

A foldable plastic tail or rear window shield for a car top or hood comprises a polyurethane monolayer. It is produced by pouring or casting a reaction mixture onto a planar casting or pouring substrate. The reaction mixture contains a bifunctional hydroxyl group-containing polyester, a trifunctional polyol, a polyisocyanate from a cycloaliphatic isocyanate urea adduct dissolved in a isophorone diisocyanate and optionally a bifunctional isophorone diisocyanate.

25 Claims, No Drawings

FLEXIBLE PLASTIC WINDOW SHIELD AND PROCESS FOR ITS PRODUCTION

This application is a continuation of application Ser. No. 07/919,264, filed on Jul. 27, 1992, now abandoned, and a continuation-in-part of application Ser. No. 07/678,705, filed Apr. 1, 1991, now U.S. Pat. No. 5,277,944, granted Jan. 11, 1994.

BACKGROUND OF THE INVENTION

1. Field of the Invention

The present invention relates to a plastic, flexible window shield, particularly a foldable rear window shield for a car top or hood. It also relates to a process for producing such a flexible window shield.

2. Discussion of the Background

Numerous different demands are made on flexible, plastic window shields. On the one hand they must have good optical characteristics, so as to make it possible to look through them in a distortion-free manner and must be adequately rigid so that in the taut state, i.e. with the top closed, they are as free from undulations as possible. On the other hand they must be sufficiently flexible to be able to participate in the folding process, but without bending. They must also have a high mechanical strength, a good scratch resistance and a high UV stability. The required characteristics must also be maintained over a long period of time, as well as at high and low temperatures.

The known flexible window shields comprise multilayer sheets. Thus, e.g. EP 85 006 B1 discloses a flexible window shield, which is made from an impact-resistant and tear-resistant core layer of polycarbonate or polyurethane-polyurea, on which are placed cover layers of highly elastic polyurethane with self-healing characteristics. The polyurethane-polyurea forming the core layer has in said known flexible window shield a substantially linear molecular structure and aliphatically or cycloaliphatically bound urethane and urea segments and is obtained by the reaction of a free isocyanate group-containing prepolymer with primary, aliphatic or cycloaliphatic diamines having an average molecular weight of 60 to 340, in which the prepolymer is produced from a polyester diol or a polyether diol with in each case an average molecular weight of 400 to 4000, or from a mixture of such polyester diols and polyether diols and shortchain, aliphatic diols with an average molecular weight of 62 to 250 and an aliphatic or cycloaliphatic diisocyanate, which is present in excess compared with the free hydroxyl groups. Although such a polyurethane has the necessary rigidity and tear resistance, but not the desired scratch resistance, onto said core layer are applied scratch-proof cover layers made from a relatively flexible, highly elastic polyurethane. As a result of its multilayer structure the production process for said known, flexible window shields is relatively complicated and costly. A flexible window shield known from DE 36 36 264 has a multilayer construction. In this case a transparent, flexible PVC sheet is provided on at least one side with a covering layer of an elastic, transparent two-component polyurethane varnish based on hydroxyl group-containing polyesters or hydroxyl group-containing polyacrylates or mixtures therefrom, which are crosslinked with polyisocyanates.

The problem of the invention is to provide a flexible window shield having a simple structure, which is able to fulfill the requirements regarding the mechanical strength characteristics and also have the necessary characteristics with respect to the scratch resistance.

SUMMARY OF THE INVENTION

According to the invention the flexible window shield comprises a polyurethane monolayer and is prepared from a reaction mixture having the following composition:

100 parts by weight of a polyol component of 30 to 70% by weight, preferably 40 to 60%, more preferably 46 to 54%, of a bifunctional, hydroxyl group-containing polyester with an average molar mass of 800 to 1200 g/mole and an OH content of 2.83 to 4.25% and 30 to 70% by weight, preferably 40 to 60%, more preferably 46 to 54%, of a trifunctional polyol based on caprolactone with an average molar mass of 400 to 650 g/mole and an OH content of 7.9 to 12.7%.

40 to 65 parts by weight, preferably 50 to 65 parts, more preferably 50 to 60 parts, of an isocyanate component of 70 to 100% by weight of a polyisocyanate from a cycloaliphatic isocyanate urea adduct dissolved in isophorone-diisocyanate and having a NCO content of 25 to 31% and 0 to 30% by weight of a bifunctional isophorone diisocyanate preferably with a molar mass of 223 g/mole and a NCO content of 37.6%.

The molecular weights appearing herein are preferably determined by weight average ($\overline{M}w$) methods. Where preferred by the skill artison number average ($\overline{M}n$) may be used, however the absolute number may vary.

The reaction mixture may then be poured or cast onto a substrate, such as glass, and then, in a preferred embodiment, cured. Preferably the thickness of the poured composition is about 0.5 to 2 mm, more preferably about 1 to 1.5 mm.

For improving the flow behavior when pouring or casting the reaction mixture, it is advantageous to admix with the reaction mixture a flow control agent. Good results are obtained if it is added in amounts up to 2%, most preferably 0.05 to 1.0% by weight, based on the reaction mixture, of a polyether-modified dimethyl polysiloxane copolymer, such as those described in U.S. Pat. No. 4,826,914, incorporated by reference, are added to the reaction mixture as the flow control agent.

It is also appropriate to admix with the reaction mixture in per se known manner a light stability agent, such as those disclosed in *Plastic Additives*, Flick, E. W., Noyes Publications, N.J. (1986), pp. 540–592. Particularly appropriate for this purpose are products of sterically hindered amines, such as tertiary amines, cyclic amines, aromatic amines, and/or those disclosed in *Plastic Additives*, supra, which are added to the reaction mixture, e.g., in a quantity of 0.5 to 2% by weight, most preferably 0.8 to 1.2%, based thereon. The preferred sterically hindered amine is sebacate bis-(1,2,2,6,6-pentamethyl-4-piperidyle). For initiating and accelerating the reaction, in per se known manner a reaction catalyst is added to the reaction mixture, such as dibutyl tin dilaurate, in a quantity of 0.01 to 0.1% by weight, most preferably 0.01 to 0.03% based on the reaction mixture.

The inventively produced, foldable rear window shields have the particular advantage that they can be produced in a single operation, e.g., by pouring or casting on a suitable pouring or casting substrate. Following the curing reaction, the sheets are removed from the pouring substrate and are immediately ready for use. The sheets produced have a high tear strength, a high elongation at break and a low plastic deformability and are much more flexible than the known multilayer sheets, so that they can be folded in a very satisfactory manner. In particular they have excellent high elastic characteristics and consequently a good scratch resistance. Thus, the sheets produced according to the invention have all the properties required of foldable rear window shields and are much less complicated and costly to manufacture than the known flexible shields.

Although, as stated hereinbefore, the sheet is already ready to use after removal from the pouring substrate, it can be advantageous as a function of the reaction mixture used, to further improve its surface characteristics by a chemical postcuring process. Such a chemical postcuring, preferably on both sides of the sheet, leads to the complete hardening of any residual isocyanate on the surface, so that following said treatment there is no further isocyanate on the sheet surfaces. Such a chemical postcuring can comprise exposing the sheet at approximately 90° to 100° C. to a water vapor-saturated atmosphere for a few minutes. It is also possible for the same purpose to expose the sheet to an amine-containing atmosphere at a temperature from about 20° C. to about 70° C., or to treat it in a dipping bath of an amine-containing aqueous solution. This kind of post-treatment is described for example in U.S. Pat. Nos. 4,830,806 and 5,032,665, incorporated by reference.

Essential representative properties are, with regards to the mechanical strength, particularly the tear strength and elongation at break and, with regards to the scratch resistance, the abrasion resistance and scratch hardness. If plastic sheets are to be used as foldable rear window shields, these properties preferably should have the following values:

| Tear strength | ≧19 N/mm² |
|---|---|
| Elongation at break | ≧200% |
| Abrasion resistance | ≦5% |
| Scratch hardness | ≧0.2 N |

The tear strength and elongation at break are determined according to the method described in DIN 53455.

The method described in ECE standard R-43 is used for determining the abrasion resistance, in that two abrasively acting friction rollers weighing 500g are applied for 100 revolutions to the rotating testpiece. In order to evaluate the abrasion resulting from this action, using the method described in ECE standard R-3 the turbidity increase is measured in comparison with the original pre-treatment turbidity and is given as a percentage.

The microscratch hardness is determined according to the Erichsen method, in which a test device of the type described in DIN 53 799 is used, with the exception that the scratching diamond has a cone angle of 50° and a roundness radius of 15 micrometers at the cone apex. For evaluating the scratch hardness the highest loading weight of the scratching diamond is given, at which there is no permanently visible damage to the surface.

DESCRIPTION OF THE PREFERRED EMBODIMENTS

Hereinafter various examples for the production of polyurethane sheets suitable for use as foldable rear window shields are given. Obviously, numerous modifications and variations of the present invention are possible in light of the above teachings. It is therefore to be understood that within the scope of the appended claims, the invention may be practiced otherwise than as specifically described herein.

EXAMPLE 1

A reaction mixture (NCO/OH=1.0) is prepared in the following way:

| | |
|---|---|
| 50 g | of bifunctional hydroxyl group-containing polyester with an average molar mass of 1063 g/mole and an OH content of 3.2% (OXYSTER T 1136 of HÜLS AG), |
| 50 g | of trifunctional polyol based on caprolactone with an average molar mass of 540 g/m and an OH content of 9.5% (TONE 0305 of UNION CARBIDE CORPORATION), |
| 15 g | of bifunctional isophorone diisocyanate with a molar mass of 223 g/mole and a NCO content of 37.6% (IPDI of HÜLS AG), |
| 35 g | of polyisocyanate from a cycloaliphatic isocyanate urea adduct dissolved in isophorone diisocyanate having a NCO content of 28% (IPDI-H 2921 of HÜLS AG), |
| 0.2 g | of polyether-modified dimethyl polysiloxane copolymer (SILWET of Union Carbide), |
| 1.5 g | of sterically hindered amine (TINUVIN of Ciba Geigy) and |
| 0.04 g | of dibutyl tin dilaurate | are intensely mixed for 10 minutes at ambient temperature. The thus homogenized reaction mixture is poured in a layer thickness of 1.3 mm onto a glass plate at approximately 60° C. and cured in an oven at 90° C. for 60 minutes. The sheet is then removed from the glass plate and treated for 5 minutes in an oven at a temperature of 100° C. and a water vapor-saturated atmosphere.

The measurements performed on a sheet produced according to this example gave the following values:

| Tear strength: | 34.1 ± 6.0 N/mm² |
|---|---|
| Elongation at break: | 373 ± 22% |
| Abrasion resistance: | 1.93 ± 0.3% |
| Scratch hardness: | 0.27 N |

EXAMPLE 2

A reaction mixture with a NCO/OH ratio of 1.1 was produced from the following components:

| | |
|---|---|
| 50 g | of bifunctional hydroxyl group-containing polyester with an average molar mass of 1063 g/mole and an OH content of 3.2%. |
| 50 g | of trifunctional polyol based on caprolactone with an average molar mass of 540 g/m and an OH content of 9.5%, |
| 17.1 g | of bifunctional isophorone diisocyanate with a molar mass of 223 g/mole and a NCO content of 37.6%, |
| 39.8 g | of polyisocyanate from a cycloaliphatic isocyanate urea adduct dissolved in isophorone diisocyanate and having a NCO content of 28%, |
| 0.2 g | of polyether-modified dimethyl polysiloxane copolymer, |
| 1.5 g | of sterically hindered amine and |
| 0.04 g | of dibutyl tin dilaurate. |

The sheet produced from the reaction mixture in the manner described in example 1 has the following characteristics:

| Tear strength: | 37.7 ± 4.3 N/mm² |
|---|---|
| Elongation at break: | 275 ± 13.5% |
| Abrasion resistance: | 2.95 ± 0.41% |
| Scratch hardness: | 0.11 N |

EXAMPLE 3

A 1.3 mm thick sheet was produced from the following reaction mixture (NCO/OH=1.2):

| | |
|---|---|
| 50 g | of bifunctional hydroxyl group-containing polyester with an average molar mass of 1063 g/mole and an OH content of 3.2%, |
| 50 g | of trifunctional polyol based on caprolactone with an average molar mass of 540 g/m and an OH content of 9.5%, |
| 18.6 g | of bifunctional isophorone diisocyanate with a molar mass of 223 g/mole and a NCO content of 37.6%, |
| 43.5 g | of polyisocyanate from a cycloaliphatic isocyanate urea adduct dissolved in isophorone diisocyanate and having a NCO content of 28%, |
| 0.2 g | of polyether-modified dimethyl polysiloxane copolymer, |
| 1.5 g | of sterically hindered amine and |
| 0.04 g | of dibutyl tin dilaurate. |

A sheet made from this reaction mixture has the following characteristics:

| | |
|---|---|
| Tear strength: | 31.7 ± 7.1 N/mm² |
| Elongation at break: | 219 ± 29% |
| Abrasion resistance: | 3.43 ± 0.91% |
| Scratch hardness: | 0.14 N |

EXAMPLE 4

A 1.3 mm thick sheet was produced from the following reaction mixture (NCO/OH=1.0):

| | |
|---|---|
| 70 g | of bifunctional hydroxyl group-containing polyester with an average molar mass of 1063 g/mole and an OH content of 3.2%, |
| 30 g | of trifunctional polyol based on caprolactone with an average molar mass of 540 g/m and an OH content of 9.5%, |
| 12 g | of bifunctional isophorone diisocyanate with a molar mass of 223 g/mole and a NCO content of 37.6%, |
| 28 g | of polyisocyanate from a cycloaliphatic isocyanate urea adduct dissolved in isophorone diisocyanate and having a NCO content of 28%, |
| 0.2 g | of polyether-modified dimethyl polysiloxane copolymer. |
| 1.5 g | of sterically hindered amine and |
| 0.04 g | of dibutyl tin dilaurate. |

The measurements of the mechanical characteristics gave the following values:

| | |
|---|---|
| Tear strength: | 10.8 ± 3.1 N/mm² |
| Elongation at break: | 481 ± 54% |
| Abrasion resistance: | 1.6 ± 0.26% |
| Scratch hardness: | 0.17 N |

EXAMPLE 5

A 1.3 mm thick sheet was produced from the following reaction mixture (NCO/OH=1.0):

| | |
|---|---|
| 30 g | of bifunctional hydroxyl group-containing polyester with an average molar mass of 1063 g/mole and an OH content of 3.2.%, |
| 70 g | of trifunctional polyol based on caprolactone with an average molar mass of 540 g/m and an OH content of 9.5%, |
| 18.6 g | of bifunctional isophorone diisocyanate with a molar mass of 223 g/mole and a NCO content of 37.6%, |
| 43.3 g | of polyisocyanate from a cycloaliphatic isocyanate urea adduct dissolved in isophorone diisocyanate and having a NCO content of 28%. |
| 0.2 g | of polyether-modified dimethyl polysiloxane copolymer, |
| 1.5 g | of sterically hindered amine and |
| 0.04 g | of dibutyl tin dilaurate. |

The measurements of the mechanical characteristics gave the following values:

| | |
|---|---|
| Tear strength: | 29.3 ± 14.7 N/mm² |
| Elongation at break: | 258 ± 30% |
| Abrasion resistance: | 5.23 ± 0.41% |
| Scratch hardness: | 0.23 N. |

EXAMPLE 6

A 1.3 mm thick sheet was produced from the following reaction mixture (NCO/OH=0.8):

| | |
|---|---|
| 50 g | of bifunctional hydroxyl group-containing polyester with an average molar mass of 1063 g/mole and an OH content of 3.2%, |
| 50 g | of trifunctional polyol based on caprolactone with an average molar mass of 540 g/m and an OH content of 9.5%, |
| 45.1 g | of polyisocyanate from a cycloaliphatic isocyanate urea adduct dissolved in isophorone diisocyanate and having a NCO content of 28%. |
| 0.1 g | of polyether-modified dimethyl polysiloxane copolymer, |
| 1.0 g | of sterically hindered amine and |
| 0.02 g | of dibutyl tin dilaurate. |

The measurements of the mechanical characteristics gave the following values:

| | |
|---|---|
| Tear strength: | 18.7 N/mm² |
| Elongation at break: | 586% |
| Abrasion resistance: | 2.15% |
| Scratch hardness: | 0.09 N |

EXAMPLE 7

A 1.3 mm thick sheet was produced from the following reaction mixture (NCO/OH=0.9):

| | |
|---|---|
| 50 g | of bifunctional hydroxyl group-containing polyester with an average molar mass of 1063 g/mole and an OH content of 3.2%, |
| 50 g | of trifunctional polyol based on caprolactone with an average molar mass of 540 g/m and an OH content of 9.5%, |
| 50.4 g | of polyisocyanate from a cycloaliphatic isocyanate urea adduct dissolved in isophorone diisocyanate and having a NCO content of 28%, |
| 0.1 g | of polyether-modified dimethyl polysiloxane copolymer, |
| 1.0 g | of sterically hindered amine and |
| 0.02 g | of dibutyl tin dilaurate. |

The measurements of the mechanical characteristics gave the following values:

| Tear strength: | 25.4 N/mm² |
|---|---|
| Elongation at break: | 370% |
| Abrasion resistance: | 2.99% |
| Scratch hardness: | 0.25 N |

EXAMPLE 8

A 1.3 mm thick sheet was produced from the following reaction mixture (NCO/OH=1.0):

| 50 g | of bifunctional hydroxyl group-containing polyester with an average molar mass of 1063 g/mole and an OH content of 3.2%, |
|---|---|
| 50 g | of trifunctional polyol based on a caprolactone with an average molar mass of 540 g/m and an OH content of 9.5%, |
| 56.4 g | of polyisocyanate from a cycloaliphatic isocyanate urea adduct dissolved in isophorone diisocyanate and having a NCO content of 28%, |
| 0.1 g | of polyether-modified dimethyl polysiloxane copolymer, |
| 1.0 g | of sterically hindered amine and |
| 0.02 g | of dibutyl tin dilaurate. |

The measurements of the mechanical characteristics gave the following values:

| Tear strength: | 40.5 N/mm² |
|---|---|
| Elongation at break: | 288% |
| Abrasion resistance: | 4.27% |
| Scratch hardness: | 0.30 N |

What is claimed as New and Desired to be Secured by Letters Patent of the United States is:

1. A flexible window shield consisting of a polyurethane monolayer sheet in the shape of an automobile window shield wherein said polyurethane has been prepared by reacting:
   (a) 100 parts by weight of a polyol component consisting essentially of
      (a1) from 30 to 70% by weight of a bifunctional hydroxyl group containing polyester with an average molar mass of 800 to 1200 g/mole and an OH content of 2.83 to 4.25% and
      (a2) 30 to 70% by weight of a trifunctional polyol based on caprolactone with an average molar mass of 400 to 650 g/mole and an OH content of 7.9 to 12.7%;
   (b) 40 to 65 parts by weight of an isocyanate component comprising
      (b1) from 70 to 100% by weight of a polyisocyanate obtained by dissolving a cycloaliphatic isocyanate urea adduct in isophorone diisocyanate and having a NCO content of 25 to 31% and
      (b2) 0 to 30% by weight of an isophorone diisocyanate.

2. The flexible window shield according to claim 1 wherein the shield has a thickness of about 0.5 to 2 mm.

3. The flexible window shield according to claim 2 wherein a flow control agent is present in said polyurethane in an amount of about 0.05 to 1.0% by weight, based on the reaction mixture.

4. The flexible window shield according to claim 3 wherein said flow control agent is a polyether-modified dimethyl polysiloxane copolymer.

5. The flexible window shield according to claim 2 wherein a light stability agent is present in said polyurethane in an amount of about 0.5 to 2% by weight, based on the reaction mixture.

6. The flexible window shield according to claim 5, wherein said light stability agent is a sterically hindered amine.

7. The flexible window shield according to claim 2 wherein a reaction catalyst is present in said polyurethane.

8. The flexible window shield according to claim 7 wherein said reaction catalyst is dibutyl tin dilaurate.

9. The flexible window shield of claim 2 wherein both sheet surfaces are exposed to constituents which react with isocyanate present on the surfaces.

10. The flexible window shield of claim 9 wherein sheet is surface treated in an water vapor saturated atmosphere at approximately 90° to 100° C.

11. The flexible window shield of claim 9 wherein the sheet is surface treated in amine containing atmosphere at approximately 20° to 70° C.

12. A flexible window shield of claim 9 wherein said sheet is surface treated in a dipping bath of an amine containing aqueous solution.

13. A method of making a flexible window shield consisting of a monolayer sheet of a polyurethane, comprising pouring or casting a reaction mixture onto a substrate;
   said reaction mixture comprising:
      100 parts by weight of a polyol component consisting essentially of from 30 to 70% by weight of a bifunctional hydroxyl group containing polyester with an average molar mass of 800 to 1200 g/mole and an OH content of 2.83 to 4.25% and 30 to 70% by weight of a trifunctional polyol based on a caprolactone with an average molar mass of 400 to 650 g/mole and an OH content of 7.9 to 12.7%;
      40 to 65 parts by weight of an isocyanate component comprising from 70 to 100% by weight of a polyisocyanate derived by dissolving a cycloaliphatic isocyanate urea adduct in isophorone diisocyanate and having a NCO content of 25 to 31% and 0 to 30% by weight of a bifunctional isophorone diisocyanate;
   curing said reaction mixture, and separating a monolayer sheet from said substrate.

14. The process according to claim 13 wherein said reaction mixture is poured or cast in a thickness of 0.5 to 2 mm.

15. The process according to claim 13 wherein said reaction mixture comprises a flow control agent, a light stability agent, a reaction catalyst or a mixture thereof.

16. The process according to claim 13, wherein the sheet is exposed on both surfaces to constituents which react with isocyanate still present on the surfaces.

17. The process according to claim 16, wherein the sheet is exposed to a water vapor-saturated environment, an amine-containing atmosphere, or an amine-containing solution.

18. The process according to claim 15, wherein said flow control agent is added in about 0.05 to 1.0% by weight, based on said reaction mixture, and said flow control agent is a polyether-modified dimethyl polysiloxane copolymer.

19. The process according to claim 15, wherein said light stability agent is added in about 0.5 to 2% by weight, based on the reaction mixture, and said light stability agent is a sterically hindered amine.

20. The process according to claim 15, wherein said reaction catalyst is dibutyl tin dilaurate.

21. The flexible window shield according to claim 1 wherein said isophorone diisocyanate has a molar mass of 223 g/mole and a NCO content of 37.6%.

22. The process according to claim 13 wherein said isophorone diisocyanate has a molar mass of 223 g/mole and a NCO content of 37.6%.

23. The flexible window shield according to claim 1 wherein the shield has been treated by being submitted to a postcuring treatment to improve surface characteristics of the shield.

24. The process according to claim 13 wherein the cast sheet is submitted to a postcuring treatment to improve surface characteristics of the sheet.

25. The flexible window shield according to claim 1, wherein the molar mass of said bifunctional hydroxyl group containing polyester is in the range of 1063 to 1200 g/mole.

* * * * *